United States Patent Office 3,424,812
Patented Jan. 28, 1969

3,424,812
CATALYST PREPARATION
Eric James Howman, Crowthorne, Christopher Patrick Cadman Bradshaw, Sunbury-on-Thames, and Leonard Turner, Woking, England, assignors to The British Petroleum Company Limited, London, England, a corporation of England
No Drawing. Filed Apr. 7, 1966, Ser. No. 540,819
Claims priority, application Great Britain, Apr. 23, 1965, 17,222/65
U.S. Cl. 260—683        18 Claims
Int. Cl. C07c 3/62; B01j 11/32

This invention relates to the preparation of catalysts and particularly to the preparation of catalysts comprising rhenium heptoxide and alumina which are useful for effecting the disproportionation of acyclic olefins.

It is known to disproportionate acyclic olefins using a catalyst consisting essentially of rhenium heptoxide and alumina. So far as the preparation of such catalysts is described it is stated that they may be conveniently prepared by mixing a solution of ammonium perrhenate with alumina and heating to convert the perrhenate to the heptoxide.

It has now been found that catalysts comprising a rhenium heptoxide and alumina may be prepared which have high activity and greater selectivity than the catalysts prepared from ammonium perrhenate by impregnation.

According to one aspect of the present invention there is provided a process for the preparation of a rhenium heptoxide catalyst which comprises heating rhenium heptoxide in a stream of a carrier gas whereby it is sublimed on to alumina located downstream to the rhenium heptoxide.

In one embodiment the rhenium heptoxide is heated to a temperature in the range 150 to 700° C., e.g. to about 300° C., in a tube using air as a suitable carrier gas. The alumina is located in the tube downstream from the heptoxide and the temperature of the alumina in this embodiment does not rise above 50° C. When all the rhenium heptoxide has sublimed onto the alumina the product is activated by fluidising it in a stream of dry air at a temperature of 500°–600° C. At the end of the activation the catalyst is purged with dry nitrogen.

In a further and preferred embodiment of the invention, the rhenium heptoxide is generated in situ by thermally decomposing ammonium perrhenate located in the lower portion of a vertical tube, in an ascending stream of dry air and the rhenium heptoxide formed by the thermal decomposition is volatilised and carried by the ascending air stream into a bed of pre-heated alumina located in an upper portion of the vertical tube which bed is maintained in a fluidised condition by the ascending air stream. Suitably the alumina is maintained at a temperature between 500° and 600° C. during the operating cycle.

The finished catalyst preferably contains 0.1 to 40 parts of the rhenium heptoxide per 100 parts of alumina.

It is an advantage of the rhenium heptoxide catalysts prepared by the method of the present invention that they have especially high activity and selectivity in effecting the disproportionation of acyclic olefins.

Before use the catalysts may be subjected to thermal activation, either in a stream of an inert gas such as nitrogen, carbon dioxide or helium, or preferably in a stream of air or oxygen followed by a final treatment in an inert gas. Suitably the catalysts are treated in air at a temperature in the range 300–900° C. for 1 minute to 20 hours and then under similar conditions with an inert gas such as nitrogen.

As stated above the catalysts prepared by the process of the present invention are suitable for effecting the disproportionation of acyclic olefins. By the term "disproportionation" throughout the specification is meant the conversion of the feed hydrocarbon to a mixture of hydrocarbons having lower and higher carbon numbers than the feed hydrocarbon.

Acyclic olefins useful as feed are $C_3$–$C_{30}$ alkenes, preferably $C_{3-8}$ straight-chain alkenes, e.g. propylene, butene-1, butene-2, pentene-1, pentene-2, hexene-1, hexene-2, hexene-3, heptene-1, heptene-2, heptene-3, octene-1 and octene-2, etc. Branched-chain $C_3$–$C_{30}$ alkenes are also suitable feeds.

The process may be carried out batch-wise or in a continuous manner, using the catalyst in the form of a fixed bed, a fluidised bed or a moving bed. If desired the disproportionated product may be separated into fractions and selected fractions, e.g. unconverted feed or fractions not having the desired carbon number, may be recycled to the reactor.

The conditions under which the process is carried out may vary with the composition of the feed and the desired products. Reaction temperatures may range from $-20°$ C. to $+500°$ C., temperatures in the range 20–100° C. being preferred. As the temperature decreases from 150–20° C. the selectivity of the reaction increases. For example using butene-1, at lower temperatures in the range 150–20° C. the selectivity to ethylene and hexenes increases. Although disproportionation activity declines with reducing temperatures, significant activity is still achieved at temperatures as low as $-20°$ C. Reaction pressures may be 0–2000 p.s.i.g. Reaction times may vary between 0.01 second and 120 minutes, preferably between 0.1 second and 10 minutes. Suitable olefin/catalyst weight ratios are in the range 1:1000.

If desired the process may be effected in the presence of an inert diluent, for example paraffinc or cyclo-paraffinc hydrocarbons.

Catalysts prepared by the process of the present invention are also suitable for use in the codisproportionation ofe olefins and in the polymerization of cyclic olefins.

The invention is illustrated by the following examples.

EXAMPLE 1

Into a vertical silica tube 30 cms. long and having an internal diameter of 12 mm. were placed in ascending order, 1 cm. of quartz wool, 2.704 gms. ammonium perrhenate, 1 cm. quartz wool, 5 cms. silica chips of size 18–30 B.S.S. and 15 gms. of a commercial gamma-alumina having a surface area of 250 sq. m./g., a pore volume (less than 300 A.) of 0.37 ml./g. and an average pore diameter of 50 A., which alumina had been previously activated at 600° C. A thermocouple pocket lay along the axis of the tube and the outlet end of the tube carried a glass sinter to retain any solids carried out of the tube.

The upper zone of alumina was heated to 55° C. in a stream of dry air sufficient to fluidise the bed. The heating furnace was then lowered to heat the ammonium perrhenate which decomposed to rehenium heptoxide which then volatilised and was carried by the air stream into the fluidised bed of alumina at 550° C. The heating and fluidising was carried on for 4 hours from the time of lowering the furnace to decompose the perrhenate. The catalyst so prepared contained 14% by weight of rhenium heptoxide.

To assess the disproportionation activity of the catalyst, dry propylene was passed over it at a GHSV of 2000 at 25° C. for 30 minutes. The product distribution is set out in the table below and is compared to that achieved under analogous conditions with a catalyst prepared by the following impregnation technique and also containing 14% by weight $Re_2O_7$.

A solution of ammonium perrhenate in conductivity water is mixed with the commercial alumina used in the preparation of the catalyst above, to form a paste which is then dried at 100° C. for 12 hours. The catalyst is then heated in air at 580° C. for 1 hour and then in dry nitrogen at 580° C. for 1 hour to form a finished catalyst. The proportions of ammonium perrhenate and alumina used were such as to produce a finished catalyst containing 14% by weight of $Re_2O_7$.

| Product, percent wt. | Ex. 1 | Comparative |
|---|---|---|
| Ethylene | 11.8 | 7.0 |
| Propylene | 65.4 | 80.8 |
| Butene-s | 22.4 | 12.3 |
| Percent disproportionation | 34.7 | 19.2 |

EXAMPLE 2

Catalysts containing 1.4% by weight $Re_2O_7$ on alumina were prepared by the method described in Example 1 and by the impregnation technique described by way of comparison in Example 1. Their disproportionation activity was assessed by passing propylene over them at 40° C. and a GHSV of propylene of 1,600. The products obtained after 30 minutes on stream are set out in the table below.

| Product, percent wt. | Ex. 2 | Comparative |
|---|---|---|
| Ethylene | 4.3 | 0.4 |
| Propylene | 86.9 | 98.9 |
| Butene-2 | 8.9 | 0.7 |
| Percent disproportionation | 13.1 | 1.1 |

We claim:

1. A process for the preparation of a rhenium heptoxide catalyst which process comprises heating rhenium heptoxide in a stream of carrier gas whereby it is sublimed onto alumina located downstream of the rhenium heptoxide.

2. A process according to claim 1 wherein the rhenium heptoxide is heated to a temperature in the range 150–700° C.

3. A process according to claim 2 wherein the temperature of the alumina does not rise above 50° C.

4. A process according to claim 1 wherein the rhenium heptoxide is generated in situ by thermally decomposing ammonium perrhenate located in the lower portion of a vertical tube in an ascending stream of carrier gas and the rhenium heptoxide formed by the thermal decomposition is volatilised and carried by the ascending stream of carrier gas into a bed of preheated alumina located in an upper portion of the vertical tube, which bed is maintained in a fluidised condition by the ascending stream of carrier gas.

5. A process according to claim 4 wherein the alumina is maintained at a temperature between 500° and 600° C. during the operating cycle.

6. A process according to claim 4 wherein the carrier gas is air.

7. A process according to claim 1 wherein the finished catalyst contains 0.1–40 parts of rhenium heptoxide per 100 parts alumina.

8. A process for the activation of a catalyst prepared by a process according to claim 1 which activation process comprises subjecting dry catalyst to a thermal treatment in an inert or oxidising gas.

9. A process according to claim 8 wherein the catalyst is treated in air at a temperature in the range 300°–900° C. for 1 minute to 20 hours and then in nitrogen at a temperature in the range 300°–900° C. for 1 minute to 20 hours.

10. A process for the disproportionation of an acyclic olefin which process comprises contacting an acyclic olefin with a disproportionation catalyst prepared according to claim 1, under conditions of temperature and pressure which effect disproportionation of the feed.

11. A process according to claim 10 wherein the feed is a $C_{3-30}$ alkene.

12. A process according to claim 11 wherein the feed is a $C_{3-8}$ alkene.

13. A process according to claim 10 wherein disproportionation is effected at a temperature in the range −20°–+500° C.

14. A process according to claim 13 wherein disproportionation is effected at a temperature in the range 20°–100° C.

15. A process according to claim 10 wherein disproportionation is effected under a pressure in the range 0–2000 p.s.i.g.

16. A process according to claim 10 wherein the reaction time lies between 0.01 second and 120 minutes.

17. A process according to claim 16 wherein the reaction time lies between 0.1 second and 10 minutes.

18. A process according to claim 10 wherein the olefin/catalyst weight ratio is in the range 1000:1 to 1:1.

References Cited

UNITED STATES PATENTS 3,261,879   7/1966   Banks _____ 260—683

FOREIGN PATENTS 1,054,864   1/1967   Great Britain.

OTHER REFERENCES

Blom et al., Rhenium Catalysts, Industrial and Engineering Chemistry, vol. 54, No. 4, pp. 16–22, April 1962, TP1A58.

DELBERT E. GANTZ, *Primary Examiner.*

C. E. SPRESSER, JR, *Assistant Examiner.*

U.S. Cl. X.R.

260—666, 677; 252—461, 463

UNITED STATES PATENT OFFICE
CERTIFICATE OF CORRECTION

Patent No. 3,424,812                                                    January 28, 1969

Eric James Howman et al.

It is certified that error appears in the above identified patent and that said Letters Patent are hereby corrected as shown below:

Column 2, lines 34 and 35, "paraffinc", both occurrences, should read -- paraffinic --; line 55, "55° C." should read -- 550° C. --. Column 3, first table, first column, line 3 thereof, "Butene-s" should read -- Butene-2 --.

Signed and sealed this 17th day of March 1970.

(SEAL)
Attest:

Edward M. Fletcher, Jr.                              WILLIAM E. SCHUYLER, JR.
Attesting Officer                                                 Commissioner of Patents